(12) United States Patent
Reekers

(10) Patent No.: US 8,763,488 B2
(45) Date of Patent: Jul. 1, 2014

(54) INDUSTRIAL ROBOT WITH A TRAILING STOP

(75) Inventor: Andre Reekers, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 883 days.

(21) Appl. No.: 12/870,233

(22) Filed: Aug. 27, 2010

(65) Prior Publication Data

US 2011/0072918 A1      Mar. 31, 2011

(30) Foreign Application Priority Data

Sep. 29, 2009   (DE) .......................... 10 2009 043 404

(51) Int. Cl.
*B25J 17/00*      (2006.01)

(52) U.S. Cl.
USPC ............. 74/490.01; 901/11; 74/526; 403/116

(58) Field of Classification Search
USPC ................... 74/490.01, 490.05, 490.06, 526; 901/11, 27, 28, 29; 403/116, 117
See application file for complete search history.

(56) References Cited

U.S. PATENT DOCUMENTS

| | | | | |
|---|---|---|---|---|
| 2,242,303 A | * | 5/1941 | Irmischer | 285/282 |
| 2,780,941 A | * | 2/1957 | Kollmorgen | 74/10.2 |
| 2,935,348 A | * | 5/1960 | Jones | 403/116 |
| 2,991,662 A | * | 7/1961 | Werner | 74/526 |
| 3,971,258 A | * | 7/1976 | Kobayashi | 74/10.2 |
| 4,606,667 A | * | 8/1986 | Bailey | 403/117 |
| 4,751,986 A | * | 6/1988 | Takahashi | 188/85 |
| 4,794,814 A | * | 1/1989 | Ferguson, Jr. | 74/526 |
| 5,156,067 A | * | 10/1992 | Umeyama | 464/68.3 |
| 5,508,686 A | * | 4/1996 | Nihei et al. | 340/686.3 |
| 5,771,753 A | * | 6/1998 | Kwon et al. | 74/526 |
| 6,065,364 A | * | 5/2000 | Shiraki et al. | 74/490.01 |
| 7,086,822 B2 | * | 8/2006 | Maeda | 414/744.5 |
| 7,591,206 B2 | * | 9/2009 | Yamamoto et al. | 74/490.01 |

\* cited by examiner

*Primary Examiner* — Troy Chambers
*Assistant Examiner* — Valentin Craciun
(74) *Attorney, Agent, or Firm* — Wood, Herron & Evans, LLP

(57) ABSTRACT

The invention relates to an industrial robot, having a multiple-axis robot arm, with a base, a carousel that is rotatably supported relative to the base in reference to an axis and a mechanical stop device provided to limit a rotary motion of the carousel relative to the base. The stop device has a slider situated on the base, with stops situated at its ends, a trailing stop situated in the slider and a drive dog situated on the carousel. The drive dog and the slider are designed so that the drive dog is introduced into the slider by a corresponding rotary motion of the carousel relative to the axis and pushes the trailing stop against the relative stop. The trailing stop includes a plastically deformable damping element, which is provided to brake the carousel due to a plastic deformation caused by the trailing stop being pushed against the relevant stop by the drive dog.

12 Claims, 3 Drawing Sheets

INDUSTRIAL ROBOT WITH A TRAILING STOP

TECHNICAL FIELD

The invention relates to an industrial robot having a trailing stop.

BACKGROUND

Industrial robots are working machines, which are equipped with tools for automatic handling and/or processing of objects, and are programmable in a plurality of motion axes, for example with regard to orientation, position and process sequence. Industrial robots usually have a robot arm with a plurality of axes and programmable controllers (control devices), which control or regulate the motion sequences of the industrial robot during operation.

Robot arms include essentially a base and a carousel that is rotatably supported relative to the base in reference to an axis of rotation. The rotary motion of the carousel relative to the base frame for conventional industrial robots can be limited mechanically to less than 360° by means of fixed stops.

To enable a rotary motion of the carousel relative to the base of more than 360°, DE 296 16 401 U1 reveals an industrial robot whose base has a slide in the form of a partial circle arranged concentrically to the axis of rotation, in which a trailing stop is supported so that it can slide. A drive dog is situated on the carousel, which in the one direction of rotation of the carousel interacts with the one side of the trailing stop when the slider is reached, and interacts with the opposite side in the opposite direction, and in each case carries the trailing stop to the stop at the opposite closed end of the slide. The trailing stop can be provided with a damping coating, for example in the form of vulcanized rubber, on all sides or else only at the places subject to friction and impact. So that the trailing stop does not tip but is guided cleanly over its sliding surface, the trailing stop must have a certain width.

The object of the present invention is to specify an improved industrial robot, having a base, a carousel and mechanical stop device provided to limit a rotary motion of the carousel relative to the base.

SUMMARY

The problem of the invention is solved by an industrial robot having a multiple-axis robot arm, with a base, a carousel that is rotatably supported relative to the base in reference to an axis, and a mechanical stop device provided to limit a rotary motion of the carousel relative to the base, which has a slider situated on the base with stops situated at its ends, a trailing stop situated in the slider and a drive dog situated on the carousel, the drive dog and the slider being designed so that the drive dog is introduced into the slider by an appropriate rotary motion of the carousel relative to the axis and pushing the trailing stop against the relevant stop, and the trailing stop including a plastically deformable damping element that is provided to brake the carousel due to a plastic deformation, caused by the trailing stop being pushed against the relevant stop by the drive dog.

Accordingly, the industrial robot according to the invention comprises the robot arm with a base and the carousel supported so that it can rotate around the axis relative to the base. The rotary motion of the carousel is normally limited due to a computer program running on a control device of the industrial robot. But in order to also limit the rotary motion of the carousel mechanically, the robot arm of the industrial robot according to the invention includes the stop device. The latter in turn includes the slider, which is situated on the base or may be part of the base, and the drive dog situated on the carousel, which may be part of the carousel. Situated in the slider is the trailing stop, which is pushed against the relevant stop of the slider by the drive dog in a corresponding rotary motion of the carousel in order to limit the angle of rotation of the carousel. Because of the trailing stop, the carousel is enabled to execute a rotary motion of 360° or even more.

In order to at least reduce, or even to prevent the danger of damage to the base and/or to the carousel in the event of a collision of the drive dog and the trailing stop, or of the trailing stop and the relevant stop of the slider, according to the invention the trailing stop includes the plastically deformable damping element. The latter is plastically deformable in such a way that in the event of colliding, because of its plastic deforming it absorbs kinetic energy of the carousel, thereby brakes the carousel and at the same time creates a condition such that the carousel and/or the base is damaged as little as possible, if not indeed not at all, by the impact of the drive dog on the trailing stop or by the impact of the trailing stop on the relevant stop of the slider.

The slider can be formed concentrically to the axis and/or in a circular arc. As a result, the drive dog can guide the trailing stop in the slider to the relevant stop relatively conveniently.

The slider can be designed relatively simply according to one variant of the industrial robot according to the invention, if it has a floor on which the trailing stop slides, and/or lateral limiting walls between which the trailing stop is guided.

The stops of the slider of the industrial robot according to the invention can preferably be designed as stop faces situated at the end of the slider. These stop faces can be for example part of one or both limiting walls.

According to one embodiment of the industrial robot according to the invention, the trailing stop has two sliding plates, between which the damping element is situated, in particular attached. The two sliding plates are made for example of metal, in particular of steel. The sliding plates can preferably be designed so that if appropriate they are guided between the limiting walls, and/or if appropriate they slide on the floor of the slider. The damping element can then be designed so that if appropriate it is set away from the floor, and/or if appropriate it does not touch the limiting walls of the slider.

According to a preferred variant of the industrial robot according to the invention, however, the trailing stop is designed as a single piece and is formed solely by the damping element. Such a damping element can be produced relatively simply and inexpensively.

In order to obtain the plastic deformability, according to one embodiment of the industrial robot according to the invention the damping element can be made of a plastically deformable material. Examples of suitable plastically deformable materials are plastic, in particular polyethene or polyethylene, or in particular PE-HD, i.e., a high-density polyethene.

The damping element can also be made of metal and have the form of a corrugated hollow cylinder, in particular the form of a corrugated straight hollow circular cylinder. Such a damping element has for example the form of a corrugated pipe. In a collision the hollow cylinder, because of its corrugated form, in particular its corrugated circumferential surface, is folded up as it were, i.e., plastically deformed, whereby it absorbs energy.

Accordingly, the industrial robot according to the invention can offer the advantage that the number of damping elements or buffers can be reduced to a single damping element or buffer. In addition, it is possible to reduce the construction space required by the trailing stop.

Depending on the embodiment of the industrial robot according to the invention, its trailing stop includes a buffer or damping element, at whose ends sliding plates are attached if appropriate, which ensure moving of the trailing stop, for example on a sliding surface. The buffer or damping element serves to limit the force in a collision with the carousel or the drive dog of the carousel, preferably in both directions of rotation of the axis relative to which the carousel is rotatably supported.

If appropriate, construction space required by this trailing stop is reduced to the size of the buffer or damping element and possibly two sliding plates. Potential tipping of the trailing stop in the slider can be prevented for example by spacing the sliding plates apart by means of the buffer or damping element.

BRIEF DESCRIPTION OF THE DRAWINGS

An example of an exemplary embodiment of the invention is depicted in the attached schematic figures. The figures show the following.

DETAILED DESCRIPTION

Figure 1:
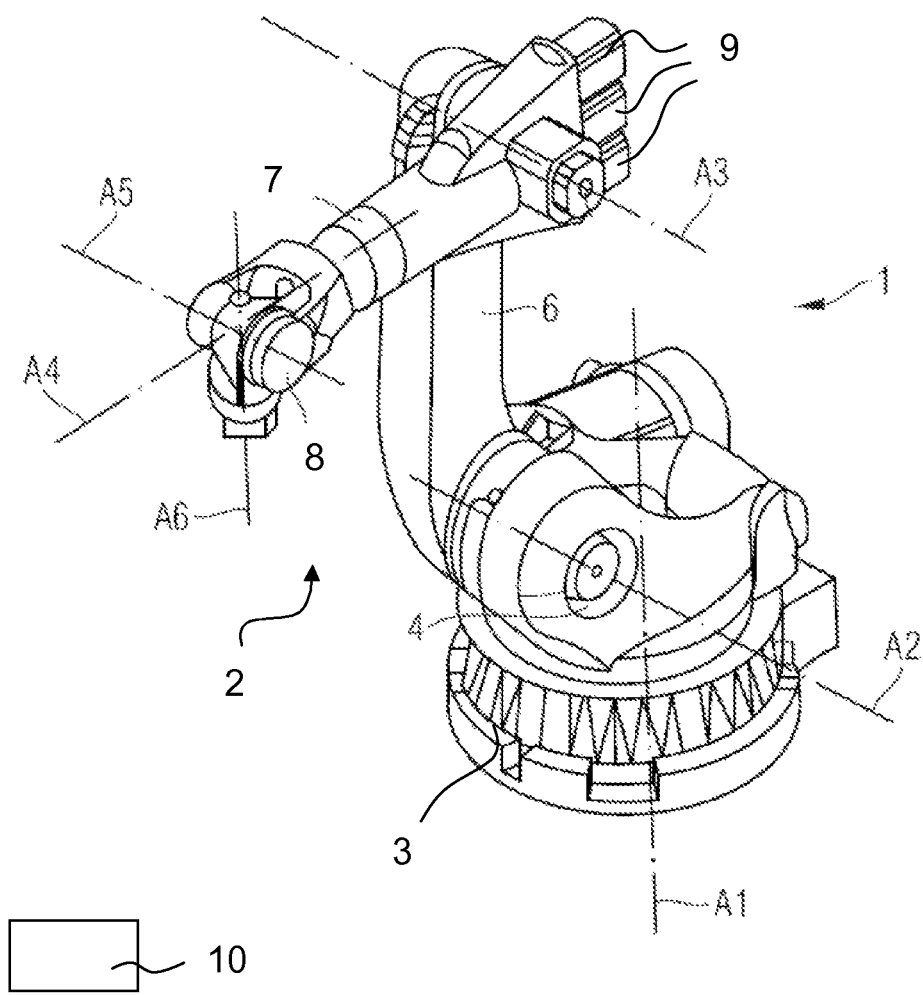
FIG. 1 an industrial robot with a robot arm having a base and a carousel.

FIG. 1 shows an industrial robot 1 with a robot arm 2 in a perspective view.

Figure 2:
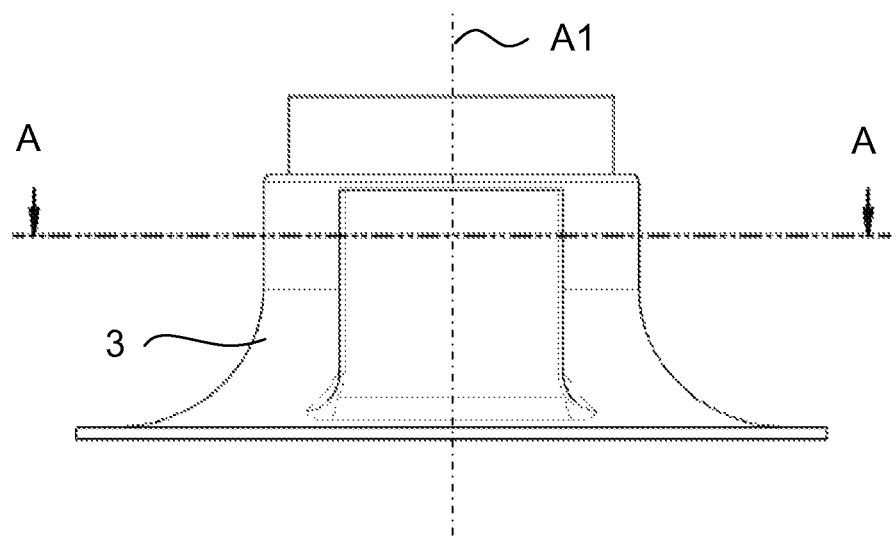
FIG. 2 a side view of the base.

In the case of the present exemplary embodiment, robot arm 2 includes a stationary or movable base 3 and a carousel 4 that is supported so that it is rotatable relative to base 3 around a vertical axis A1, which is also referred to as axis 1. A side view of base 3 is shown in FIG. 2 and a section through base 3 along the line A-A is shown in FIG. 3.

In the case of the present exemplary embodiment, robot arm 2 of industrial robot 1 also has a rocker 6, an extension arm 7 and a preferably multiple-axis robot hand 8. Rocker 6 is mounted at the lower end on carousel 4, for example on a swivel bearing head that is not shown in further detail, so that it can swivel around a preferably horizontal axis A2, which is also referred to as axis 2. At the upper end of rocker 6, extension arm 7 in turn is mounted so that it can swivel around a likewise preferably horizontal axis A3. At its end this arm carries robot hand 8, with its preferably three axes A4, A5, A6.

In order to move industrial robot 1 or its robot arm 2, the latter includes drives, in particular electric drives, that are connected in a generally known way to a control device 10. Only some of the electric motors 9 of these drives are shown in FIG. 1.

Figure 3:
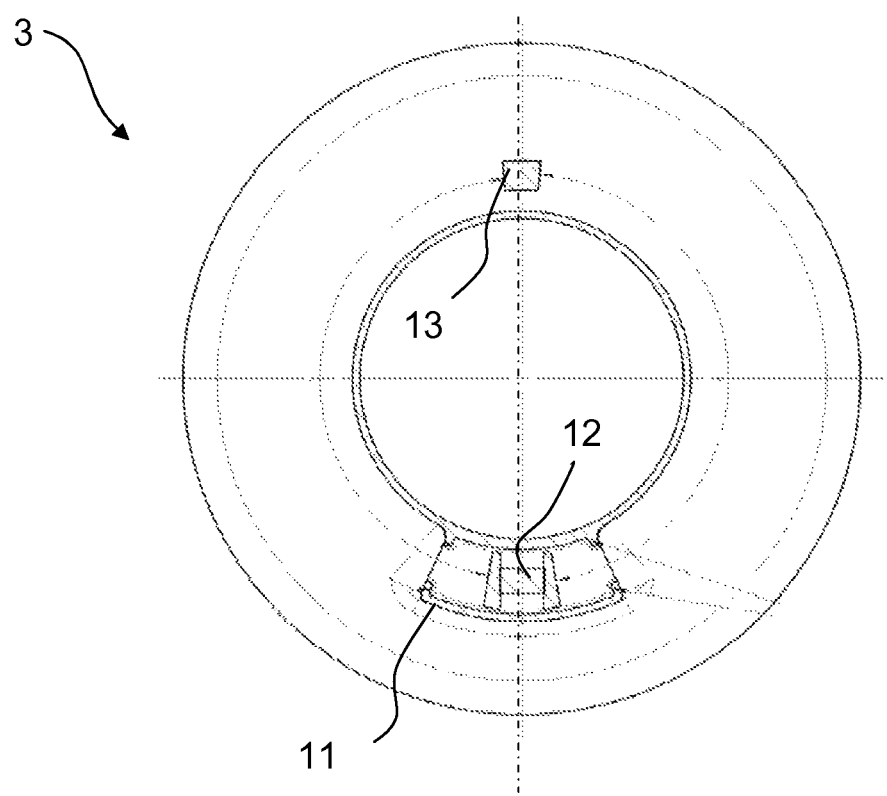
FIG. 3 the base in a cross sectional view.

In the case of the present exemplary embodiment, industrial robot 1 is designed so that a rotary motion executed by carousel 4 relative to axis A1 is mechanically limited by means of a stop device depicted in FIG. 3.

Figure 4:
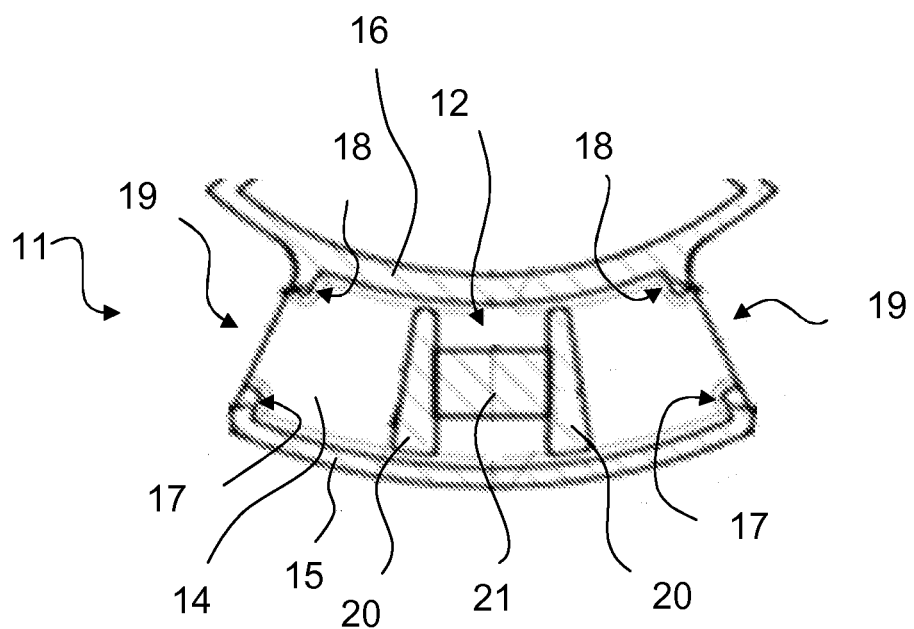
FIG. 4 a cross section through a slider of the base with a trailing stop.

In the case of the present exemplary embodiment, the stop device includes a slider 11 attached to base 3, with a trailing stop 12 guided therein and a drive dog 13 attached to carousel 4. Slider 11 with trailing stop 12 is shown in additional detail in FIG. 4 as a sectional view along the line A-A.

In the case of the present exemplary embodiment, slider 11 is oriented concentrically to axis A1 and has the form of a circular arc. It extends for example over an arc angle of about 60°.

Slider 11 has for example a floor 14 and two lateral limiting walls 15, 16 attached to floor 14, between which trailing stop 12 is guided. At the two ends of slider 11, the two limiting walls 15, 16 form stop faces 17, 18, against which drive dog 13 of carousel 4 pushes trailing stop 12 in a corresponding rotary motion of carousel 4 relative to axis A1. So that carousel 4 can introduce drive dog 13 into slider 11 when there is a corresponding rotary motion, slider 11 has openings 19 at both of its ends, which are limited by the floor 14 and the partial walls of limiting walls 15, 16 assigned to stop faces 17, 18.

In the case of the present exemplary embodiment, trailing stop 12 has two sliding plates 20 and a damping element 21 situated between the two sliding plates 12. In the case of the present exemplary embodiment the two sliding plates 20 are dimensioned so that they slide on the floor 14 of slider 11 and are hindered from leaving slider 11 by stop faces 17, 18. The sliding plates 20 are made for example of metal, in particular of steel.

In the case of the present exemplary embodiment, damping element 21 is attached to the sides of sliding plate 20 that face damping element 21. In addition, damping element 21 can be dimensioned so that it does not touch the limiting walls 16, 17 and/or the floor 14 of slider 11.

In the case of the present exemplary embodiment, damping element 21 is made of a plastically deformable material, so that it can absorb energy relatively well when drive dog 13 of carousel 4 presses trailing stop 12 against stop faces 17, 18. Damping element 21 is made for example of a plastic, in particular of polyethene or polyethylene (PE).

Damping element 21 can also be made for example of metal and can have in particular the form of a corrugated hollow cylinder, in particular the form of a corrugated straight hollow circular cylinder, which deforms plastically upon impact of the trailing stop against stop faces 17, 18, in order to at least partially absorb the impact energy. In this case damping element 21 has in particular the form of a corrugated pipe.

Trailing stop 12 can also be made in a single piece, in particular of a single material. Such a single-piece or single-material trailing stop 12 comprises essentially merely damping element 21 for example of plastic, in particular of polyethene or polyethylene, or of metal in the form of the corrugated hollow cylinder.

The invention claimed is:

1. A robot comprising:
a base;
a carousel supported by the base and rotatable relative to the base about an axis of rotation;
a mechanical stop operatively coupled to the base for limiting rotation of the carousel about the axis of rotation, the mechanical stop comprising:
a slider having first and second spaced-apart end stops defining a first length; and
a trailing stop member in the slider and defining a second length less than the first length such that the trailing stop member is movable between the first and second end stops;
wherein the trailing stop member comprises a damping element and a pair of sliding plates, the damping element being located between the pair of sliding plates; and
a drive dog operatively coupled to the carousel;

whereby rotation of the carousel about the axis of rotation moves the drive dog into the slider to push the trailing stop member along the slider until the trailing stop member engages against one of the end stops.

2. The robot of claim 1, further comprising:
a robot arm coupled to the base and movable about a plurality of axes.

3. The robot of claim 1, wherein the damping element is plastically deformable by virtue of contacting engagement between the trailing stop member and one of the end stops.

4. The robot of claim 1, wherein the damping element comprises a plastic material.

5. The robot of claim 4, wherein the plastic material is one of polyethene or polyethylene.

6. The robot of claim 1, wherein the damping element comprises metal.

7. The robot of claim 1, wherein the damping element is coupled to the pair of sliding plates.

8. The robot of claim 1, wherein the slider is in the shape of an arc.

9. The robot of claim 1, wherein the center of the arc is located proximate the axis of rotation.

10. The robot of claim 1, wherein the slider includes a floor surface, rotary motion of the carousel relative to the base being effective to slide the trailing stop member on the floor surface.

11. The robot of claim 1, wherein the slider comprises first and second spaced apart walls extending between the first and second end stops, the trailing stop member being slidably received between the first and second walls.

12. A robot comprising:
a base;
a carousel supported by the base and rotatable relative to the base about an axis of rotation;
a mechanical stop operatively coupled to the base for limiting rotation of the carousel about the axis of rotation, the mechanical stop comprising:
a slider having first and second spaced-apart end stops defining a first length and first and second spaced-apart walls extending between the first and second end stops; and
a trailing stop member in the slider and defining a second length less than the first length such that the trailing stop member is movable between the first and second end stops, the trailing stop member received between the first and second spaced-apart walls and having a plastically deformable damping element;
wherein the trailing stop member comprises a damping element and a pair of sliding plates, the damping element being located between the pair of sliding plates; and
a drive dog operatively coupled to the carousel; and
whereby rotation of the carousel about the axis of rotation moves the drive dog into the slider to push the trailing stop member along the slider until the trailing stop member engages against one of the end stops and plastically deform the damping element.

* * * * *